United States Patent
Yang et al.

(10) Patent No.: US 10,705,538 B2
(45) Date of Patent: Jul. 7, 2020

(54) AUTO GUIDED VEHICLE SYSTEM AND OPERATING METHOD THEREOF

(71) Applicant: Metal Industries Research & Development Centre, Kaohsiung (TW)

(72) Inventors: Kuang-Shine Yang, Tainan (TW); Chih-Ming Chang, Kaohsiung (TW); Chih-Ming Chiou, Pingtung County (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 262 days.

(21) Appl. No.: 15/884,392

(22) Filed: Jan. 31, 2018

(65) Prior Publication Data
US 2019/0235522 A1 Aug. 1, 2019

(51) Int. Cl.
G05D 1/02 (2020.01)
(52) U.S. Cl.
CPC ......... G05D 1/0291 (2013.01); G05D 1/0231 (2013.01); G05D 1/0276 (2013.01); G05D 2201/0216 (2013.01)
(58) Field of Classification Search
CPC ........... G05D 2201/0216; G05D 1/024; G05D 1/0231; G05D 1/0238; G05D 1/0265; G05D 1/0274; G05D 1/0276
See application file for complete search history.

(56) References Cited

U.S. PATENT DOCUMENTS

| | | | | |
|---|---|---|---|---|
| 4,530,056 A * | 7/1985 | MacKinnon | ......... | G05D 1/0238 180/168 |
| 5,525,884 A * | 6/1996 | Sugiura | ................ | G05D 1/0261 180/168 |
| 7,991,521 B2 * | 8/2011 | Stewart | .................. | G01C 21/00 180/170 |
| 8,288,989 B2 * | 10/2012 | Baba | ....................... | B60L 15/38 320/109 |
| 9,637,310 B1 * | 5/2017 | Zou | ....................... | G05D 1/0297 |
| 10,136,954 B2 * | 11/2018 | Johnson | ................. | A61B 34/30 |

(Continued)

FOREIGN PATENT DOCUMENTS

| CN | 2561653 | 7/2003 |
|---|---|---|
| CN | 106125739 | 11/2016 |

(Continued)

*Primary Examiner* — Redhwan K Mawari
(74) *Attorney, Agent, or Firm* — JCIPRNET

(57) ABSTRACT

An auto guided vehicle system adapting for carrying an object is provided. The auto guided vehicle system includes a plurality of auto guided vehicles. Each of the auto guided vehicles has a vehicle body and an omnidirectional wheel set, and further includes a driving device, a wireless communication module, and a processing device. The driving device drives the omnidirectional wheel set. The wireless communication module communicates with a control module of an electric device. The processing device transmits a position information to the control module through the wireless communication module. The control module determines an arrangement pattern of the auto guided vehicles on a movement plane according to an object information and the respective position information of the auto guided vehicles, such that the auto guided vehicles carry and transport the object in the arrangement pattern. Besides, an operating method is also provided.

12 Claims, 5 Drawing Sheets

(56) References Cited

U.S. PATENT DOCUMENTS

| | | | | |
|---|---|---|---|---|
| 2012/0232739 A1* | 9/2012 | Takahashi | ............... | B25J 5/007 |
| | | | | 701/25 |
| 2013/0131910 A1* | 5/2013 | Takahashi | ............... | B25J 5/007 |
| | | | | 701/27 |
| 2014/0111208 A1* | 4/2014 | Olsson | .................... | G01V 3/10 |
| | | | | 324/329 |
| 2015/0002734 A1* | 1/2015 | Lee | ...................... | H04N 5/2256 |
| | | | | 348/367 |
| 2017/0072565 A1* | 3/2017 | Egerstedt | .............. | B25J 9/1682 |
| 2018/0345504 A1* | 12/2018 | Chen | ..................... | G01C 21/00 |
| 2019/0107833 A1* | 4/2019 | Song | ................... | G05D 1/0022 |
| 2019/0168971 A1* | 6/2019 | Yang | ................... | G05D 1/0278 |
| 2019/0235522 A1* | 8/2019 | Yang | ................... | G05D 1/0248 |

FOREIGN PATENT DOCUMENTS

| | | |
|---|---|---|
| CN | 106737696 | 5/2017 |
| CN | 206287136 | 6/2017 |
| TW | 528937 | 4/2003 |
| TW | I265136 | 11/2006 |
| TW | 201247456 | 12/2012 |
| TW | 201619038 | 6/2016 |
| TW | 201629660 | 8/2016 |

\* cited by examiner

AUTO GUIDED VEHICLE SYSTEM AND OPERATING METHOD THEREOF

BACKGROUND OF THE INVENTION

Field of the Invention

The invention is related to an auto guided vehicle system, and particularly to an auto guided vehicle system and an operating method thereof.

Description of Related Art

The development and research related to auto guided vehicle (AGV) in the technical field of auto control have been increased significantly. However, in transporting operation of conventional auto guided vehicle, the size and shape of the object to be transported are subject to the weight and size of the auto guided vehicle. In other words, if the object to be transported has a special shape, the conventional auto guided vehicle cannot transport such object. Therefore, it is an important issue to explore how to effectively integrate a plurality of auto guided vehicles to perform coordinating operation so as to achieve the effect that any shape of object can be transported.

SUMMARY OF THE INVENTION

The invention provides an auto guided vehicle system and an operating method thereof, capable of using a plurality of auto guided vehicles to carry and transport objects through an arranging method corresponding to the geometric characteristic of object so that the auto guided vehicle system of the invention can effectively transport object.

In the invention, the auto guided vehicle system is adapted for transporting an object. The auto guided vehicle system includes a plurality of auto guided vehicles. Each of the auto guided vehicles has a vehicle body and an omnidirectional wheel set, and further includes a driving device, a wireless communication module, and a processing device. The driving device is configured to drive the omnidirectional wheel set. The wireless communication module is configured to communicate with a control module of an electric device by the means of wireless communication. The processing device is coupled to the driving device and the wireless communication module. The processing device is configured to transmit a position information to the control module through the wireless communication module. The control module determines an arrangement pattern of the auto guided vehicles on a movement plane according to an object information of the object and the respective position information of the auto guided vehicles, such that the auto guided vehicles carry and transport the object in the arrangement pattern.

In an embodiment of the invention, the object information includes at least one of the volume, weight and shape of the object.

In an embodiment of the invention, the plurality of auto guided vehicles are classified into a first vehicle and a second vehicle. The second vehicle tracks a moving trail of the first vehicle such that a moving trail of the second vehicle is simultaneously adjusted along with the first vehicle.

In an embodiment of the invention, when an error is generated between the moving trails of the second vehicle and the first vehicle, the second vehicle corrects the moving trail of the second vehicle respectively through determining the error between the moving trails of the second vehicle and the first vehicle respectively.

In an embodiment of the invention, each of the auto guided vehicles further includes a coding feature element and an image sensor. The coding feature element is disposed on a lateral side of a vehicle body. The coding feature element provides at least one of coding information, direction information and facing information of the vehicle body. The image sensor is disposed on the lateral side of the vehicle body and coupled to the processing device, such that each of the auto guided vehicles can sense the coding feature element of other auto guided vehicle among the plurality of auto guided vehicles using the image sensor.

In an embodiment of the invention, the coding feature element is a coding pattern having N×N dot array, wherein N is a positive integer larger than or equal to 3.

In an embodiment of the invention, the driving device is a motor, and each of the auto guided vehicles further includes a motor sensor. The motor sensor is coupled to the processing device and the driving device. The processing device uses the motor sensor to sense the driving state of the omnidirectional wheel set to obtain the moving trail of the vehicle body.

In an embodiment of the invention, the motor sensor generates a sensing signal according to the driving state of the omnidirectional wheel set. The processing device analyses the sensing signal and the driving signal provided by the driving device for driving the omnidirectional wheel set to generate an error signal, such that the processing device further determines whether to adjust the driving signal according to the error signal.

In an embodiment of the invention, each of the auto guided vehicles further includes an inertial sensor and a range sensor. The inertial sensor is coupled to the processing device. The inertial sensor senses the movement state of the vehicle body. The range sensor is coupled to the processing device. The range sensor senses a distance between the vehicle body and other auto guided vehicle among the plurality of auto guided vehicles. When the plurality of auto guided vehicles perform transporting operation, each of the auto guided vehicles further adjusts the relative position thereof in the arrangement pattern respectively according to the inertial sensor and the range sensor.

In an embodiment of the invention, each of the auto guided vehicles further includes a laser scanner. The laser scanner is coupled to the processing device. The laser scanner scans a spatial distribution information surrounding the vehicle body such that the processing device guides the moving trail of the vehicle body according to the spatial distribution information.

In the invention, an operating method of an auto guided vehicle system is adapted for an auto guided vehicle system. The auto guided vehicle system includes a plurality of auto guided vehicles, and each of the plurality of auto guided vehicles has an omnidirectional wheel set. The operating method includes the following steps. A position information of each of the plurality of auto guided vehicles is transmitted to a control module of an electronic device by a wireless communication method. The control module determines an arrangement pattern of the plurality of auto guided vehicles on a movement plane according to an objet information of the object and respective position information of the plurality of auto guided vehicles, such that the plurality of auto guided vehicles carry and transport the object in the arrangement pattern.

In an embodiment of the invention, the object information includes at least one of the volume, weight and shape of the object.

In an embodiment of the invention, the plurality of auto guided vehicles are classified into a first vehicle and at least one second vehicle, and the step of performing transporting operation on the object includes the following steps. The at least one second vehicle is configured to track the moving trail of the first vehicle such that a moving trail of the at least one second vehicle is simultaneously adjusted along with the first vehicle.

In an embodiment of the invention, the step of performing transporting operation on the object further includes the following steps. When an error is generated between the moving trails of the at least one second vehicle and the first vehicle, the error between the moving trails of the at least one second vehicle and the first vehicle is determined respectively to correct the moving trail of the at least one second vehicle respectively.

In an embodiment of the invention, the step of performing transporting operation on the object includes the following steps. The at least one image sensor of each of the plurality of auto guided vehicles is configured to sense the at least one coding feature element of other auto guided vehicle among the plurality of auto guided vehicles, so as to obtain at least one of the coding information, direction information and facing information of other auto guided vehicle.

In an embodiment of the invention, the coding feature element is a coding pattern having N×N dot array, wherein N is a positive integer larger than or equal to 3.

In summary, the auto guided vehicle system according to the embodiment of the invention can carry object by the plurality of auto guided vehicles, and determine the arrangement pattern of the auto guided vehicles according to a planar geometric shape of the object, thereby flexibly organizing the arranging method for the auto guided vehicles to carry the object. Moreover, the auto guided vehicles in the embodiment of the invention is a wheel mechanism having the omnidirectional wheel set; therefore, in the process of transporting object, the auto guided vehicle in the embodiment of the invention can move in any direction without rotating the vehicle body. Accordingly, the auto guided vehicle system in the embodiment of the invention can effectively carry and transport objects.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
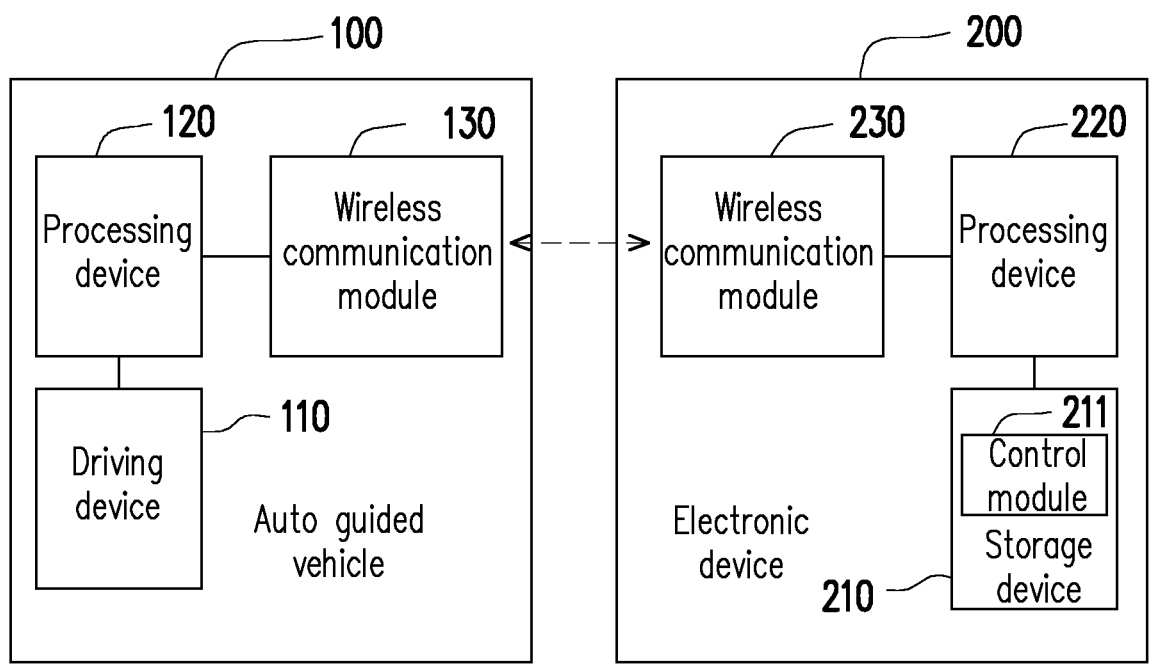
FIG. 1 is schematic block view illustrating an auto guided vehicle system according to an embodiment of the invention.

The word "couple" (or connect) in the description and claims may refer to any direct or indirect connection. For instance, in the description and claims, if a first device is coupled to (or connected to) a second device, it means that the first device may be directly connected to the second device or may be indirectly connected to the second device through another device or by another connection means. Moreover, elements/components/steps with same reference numbers represent the same or similar parts in the drawings and embodiments. The descriptions of the same elements/components/steps in an embodiment of the invention may be applied to the descriptions of the same elements/components/steps in another embodiment.

FIG. 1 is schematic block view illustrating an auto guided vehicle system according to an embodiment of the invention. Referring to FIG. 1, an auto guided vehicle 100 includes a driving device 110, a processing device 120 and a wireless communication module 130. The processing device 120 is coupled to the driving device 110 and the wireless communication module 130. An electronic device 200 includes a storage device 210, a processing device 220 and a wireless communication module 230, wherein the storage device 210 stores a control module 211 such that the processing device 220 can operate an auto guided vehicle system 10 by executing the control module 211. In the embodiment, the auto guided vehicle system 10 may include a plurality of auto guided vehicles 100 while being simultaneously coupled to the electronic device 200 in the wireless communication method. In other words, the auto guided vehicle 100 may be coupled to the wireless communication module 230 of the electronic device 200 in the wireless communication method through using the wireless communication module 130. Meanwhile, the processing device 120 in the embodiment may transmit information to the control module 211 of the electronic device 200 through using the wireless communication module 130.

In the embodiment, the electronic device 200 may be a desktop computer, a notebook computer, a tablet PC, an ultra-mobile PC (UMPC), a PDA, a smart phone, a mobile phone, a playstation portable (PSP), a work station, or a server, etc., which should not be construed as a limitation to the invention.

In the embodiment, the processing device 120 and 220 may include a central processing unit (CPU) consisting of a single core or multiple cores, or other programmable general purpose or special purpose microprocessor, a digital signal processor (DSP), a programmable controller, an application specific integrated circuit (ASIC), a programmable logic device (PLD), other similar device or a combination thereof, which is capable of executing commands related to controlling or operating the auto guided vehicle in the embodiments of the invention. Moreover, the storage device 210 may be a random access memory (RAM), a read-only memory (ROM) or a flash memory and the like, which can at least store the control module 211. Specifically, the control module 211 may be an auto control program, software or a calculating method, which can be utilized to perform the operating function described in the embodiments of the invention. Sufficient teaching, suggestions and implementation regarding the control module 211 can be derived from ordinary knowledge related to the auto control technical field, and thus no further descriptions are incorporated herein.

In the embodiment, the wireless communication module 130 and 230 may be a wireless communication module that are in compliance with various wireless communication standards such as Bluetooth, WiFi, WiMax, Near Field Communication (NFC), LTE and etc., which should not be construed as a limitation to the invention.

Figure 2A:
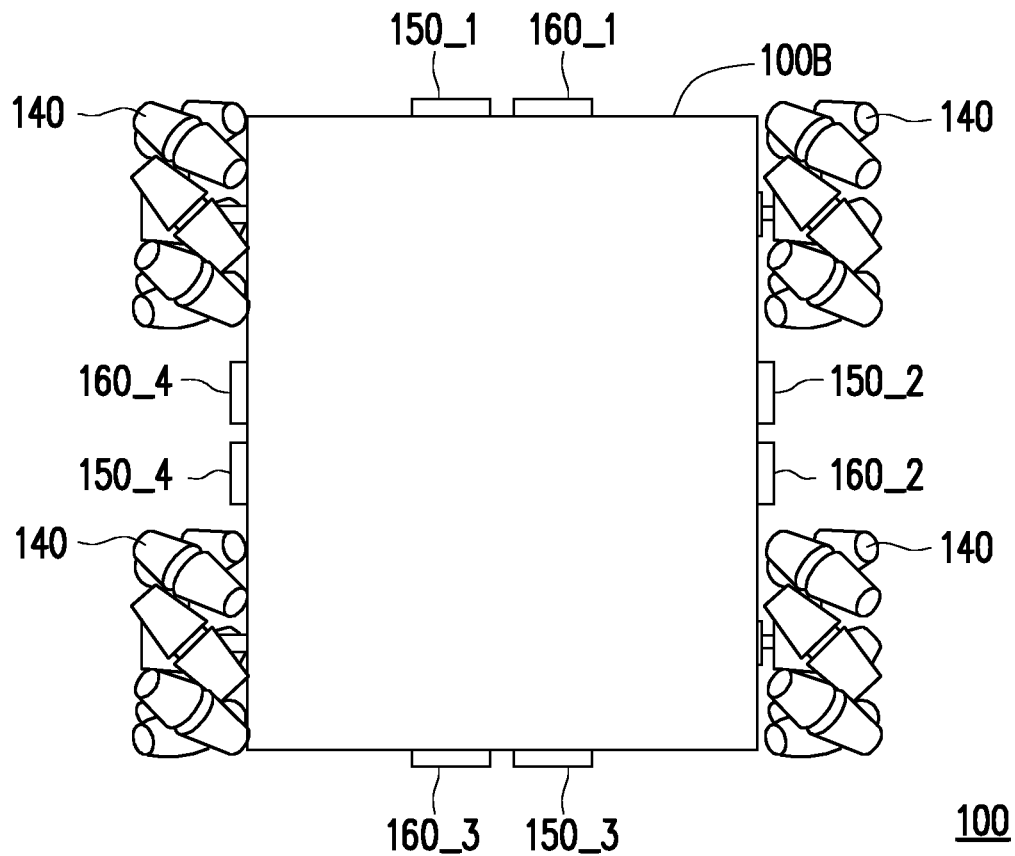
FIG. 2A is a top view illustrating an auto guided vehicle according to an embodiment of the invention.

FIG. 2A is a top view illustrating an auto guided vehicle according to an embodiment of the invention. Referring to FIG. 2A, the auto guided vehicle 100 includes a vehicle body 100B, wherein the vehicle body 100B has a wheel mechanism of an omnidirectional wheel set 140. In the embodiment, the omnidirectional wheel set 140 may include at least three or more omnidirectional wheels, and the drawings provides no limitation thereto. In other words, the auto guided vehicle 100 in the embodiment is an omnidirectional moving vehicle such that the auto guided vehicle 100 can move in any direction without rotating the vehicle body 100B. Moreover, the vehicle body 100B is provided with coding feature elements 150_1-150_4 and image sensors 160_1-160_4 on four sides. In addition, in the embodiment, the image sensors 160_1-160_4 may be a charge coupled device (CCD) image sensor, a complementary metal-oxide semiconductor (CMOS) image sensor or the like, which should not be construed as a limitation to the invention.

Figure 2B:
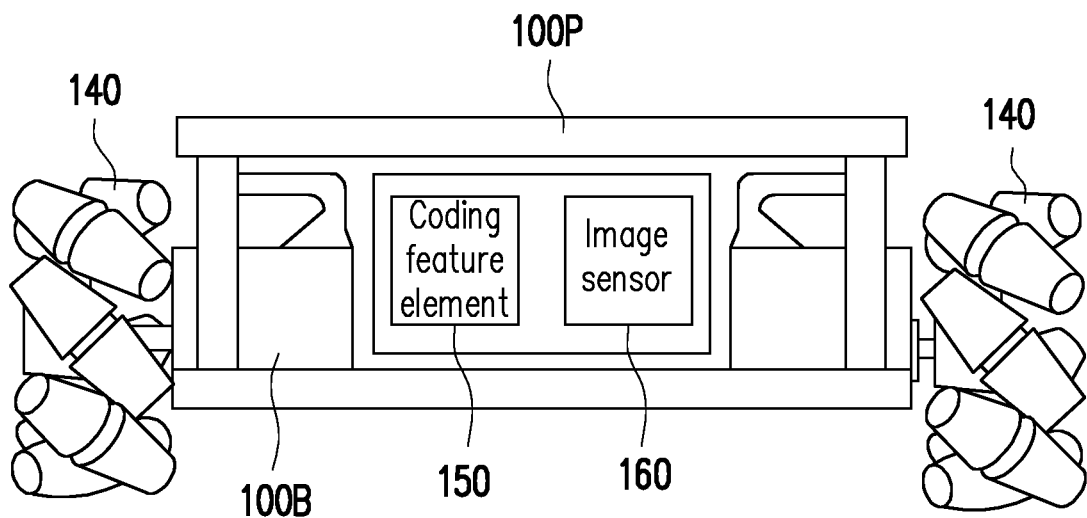
FIG. 2B is a side view illustrating an auto guided vehicle according to an embodiment of the invention.

FIG. 2B is a side view illustrating an auto guided vehicle according to an embodiment of the invention. Referring to FIG. 2B, the vehicle body 100B of the auto guided vehicle 100 has a carrying platform 100P for supporting an object. In the embodiment, the front side of the vehicle body 100B is provided with the coding feature element 150_1 and the image sensor 160_1. The coding feature element 150_1 provides vehicle information related to the vehicle body 100B such as coding information, direction information, facing information and the like. The image sensor 160_1 is coupled to the processing device (e.g., processing device 120 shown in FIG. 1) of the auto guided vehicle 100 such that the auto guided vehicle 100 can sense the coding feature element of another adjacent auto guided vehicle by using the image sensor 160_1. Therefore, in the transporting process, the auto guided vehicle 100 can obtain the above-mentioned related information by sensing the coding feature element of another adjacent auto guided vehicle, and calculate the movement state of another adjacent auto guided vehicle. In this manner, the auto guided vehicle 100 can effectively monitor the transporting state of the adjacent auto guided vehicle in the transporting process. Additionally, the schematic view illustrating other sides of the vehicle body 100B may be similar to the present embodiment, and thus no further descriptions are incorporated herein.

Figure 3A:
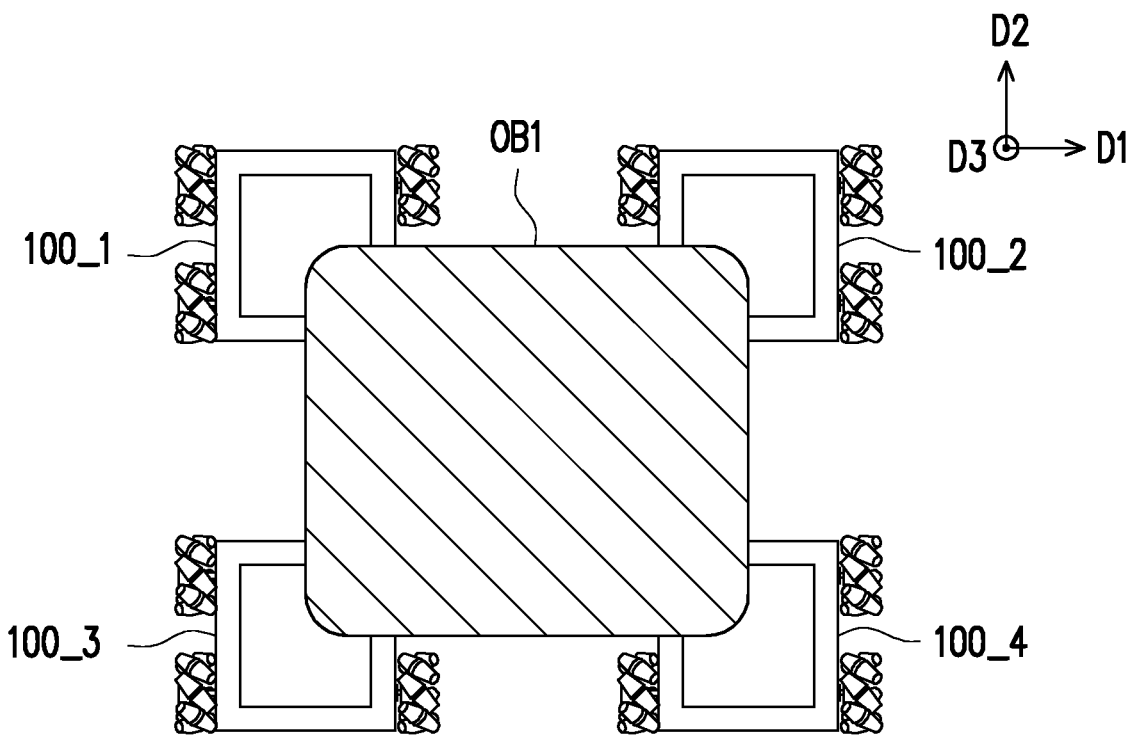
FIG. 3A is a schematic view illustrating a carried object according to an embodiment of the invention.

FIG. 3A is a schematic view illustrating a carried object according to an embodiment of the invention. Referring to FIG. 3A, take the planar geometric shape of a carried object OB1 as a square-shape as an example. In the embodiment, a first direction D1, a second direction D2 and a third direction are perpendicular to each other, and the plane to which the first direction D and the second direction D2 are extended is a movement plane. In the embodiment, the auto guided vehicle system may include four auto guided vehicles 100_1-100_4. Also, the auto guided vehicles 100_1-100_4 may be simultaneously coupled to the electronic device to transmit or receive information or data to/from the control module of the electronic device (e.g., electronic device 200 and control module 211 shown in FIG. 1). In the embodiment, the user may input the object information of the carried object OB1 to the control module in advance, and the auto guided vehicles 100_1-100_4 may transmit respective position information to the control module respectively. Thereafter, the control module may determine that the arrangement pattern of the auto guided vehicles 100_1-100_4 on the movement plane is a square-shape according to the geometric shape of the object OB1 and the position information of the auto guided vehicles 100_1-100_4, such that the auto guided vehicles 100_1-100_4 are automatically moved in the arranging method shown in FIG. 4 to carry and transport the object OB1. In other words, the auto guided vehicles 100_1-100_4 may respectively support four corners of the object OB1, thereby effectively carrying the object OB1 without using too may auto guided vehicles for transportation.

In the embodiment, the above-mentioned position information may refer to, for example, a coordinate in a geodesic coordinate of the auto guided vehicle. Alternatively, the position information of the auto guided vehicle may be obtained through global positioning system (GPS), 3G network positioning, WiFi network positioning or IP address positioning. Moreover, the above-mentioned object information may include, for example, the volume, weight, centre of gravity and shape of the object OB1, such that the control module can determine the arrangement pattern of the plurality of auto guided vehicles by analysing the object information.

It should be pointed out that, in an embodiment, the auto guided vehicles 100-1_100-_4 may be classified into a first vehicle and a second vehicle. The auto guided vehicle 100_1 is the first vehicle, and the rest of auto guided vehicles 100_2-100_4 are the second vehicles, and the second vehicles track the moving trail of the first vehicle. That is to say, the auto guided vehicle system may designate the auto guided vehicle 100_1 as the guiding vehicle. When the auto guided vehicle 100_1 determines the transporting path and moves, the rest of auto guided vehicles 100_2-100_4 can track the moving trail of the auto guided vehicle 100_1, such that the auto guided vehicles 100_1-100_4 can move simultaneously.

Furthermore, in an embodiment, the auto guided vehicle system may further be designed to have the function of adjusting centre of gravity. For example, when an error is generated between the moving trails of the at least one of the plurality of second vehicles and the first vehicle, the second vehicles can respectively correct or adjust the moving trails by determining the error between the moving trails of the second vehicles and the first vehicle respectively. It should be mentioned that the second vehicle may track the first vehicle by the means of, for example, sharing the position information of all of the auto guided vehicles through the auto guided vehicle system, such that each of the auto guided vehicles can calculate the error of the moving trail. Alternatively, the second vehicle may track the first vehicle by the means of, for example, comparing the moving trail of each of the auto guided vehicles through the auto guided vehicle system, such that the auto guided vehicle system directly transmits the control command to each of the auto guided vehicles to adjust the moving trail thereof respectively.

Moreover, in an embodiment, the auto guided vehicle may use the coding feature elements 150_1-150_4 and image sensors 160_1-160_4 as shown in FIG. 2A and FIG. 2B to sense the coding feature element of another adjacent auto guided vehicle by the means of image sensing. In this manner, in the transporting process, the auto guided vehicle can sense the movement state of the adjacent auto guided vehicle to simultaneously adjust the moving trail; the invention provides no limitation thereto.

Figure 3B:
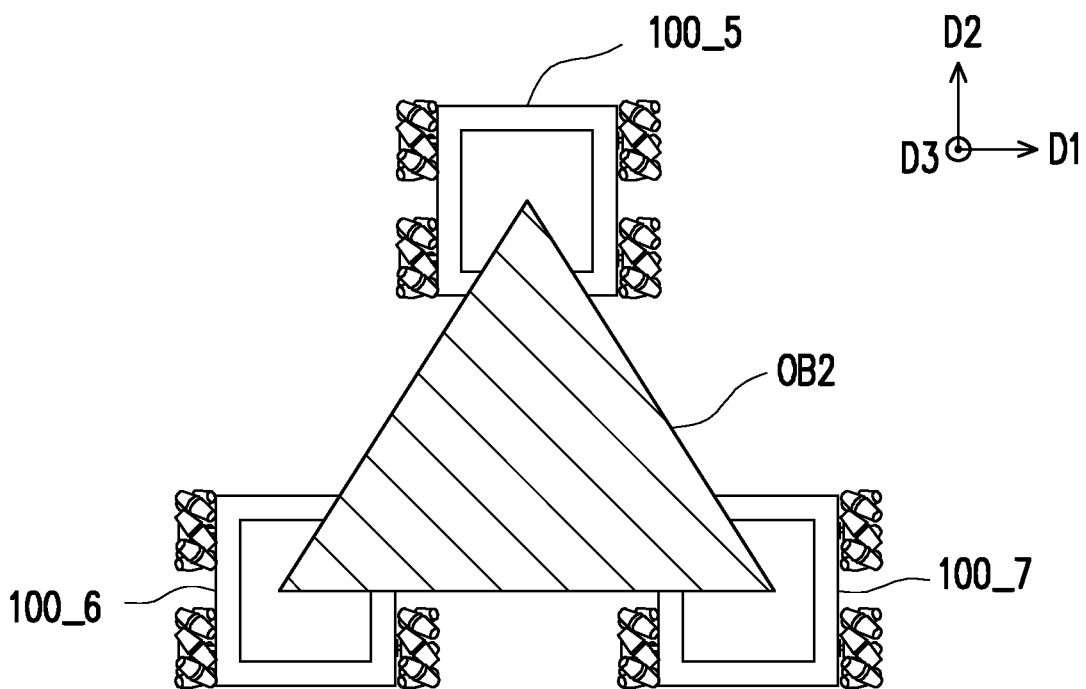
FIG. 3B is a schematic view illustrating a carried object according to another embodiment of the invention.

FIG. 3B is a schematic view illustrating a carried object according to another embodiment of the invention. Referring to FIG. 3B, take the plane geometric shape of a carried object OB2 as a triangular-shape as an example. In the embodiment, the auto guided vehicle system may include a plurality of auto guided vehicles 100_5-100_7. Meanwhile, three auto guided vehicles 100_5-100_7 may be simultaneously coupled to the electronic device to transmit or receive information to/from the control module of the electronic device (e.g., electronic device 200 and control module 211 shown in FIG. 1). As compared with the embodiment in FIG. 3A, since the object OB2 in the embodiment is triangular-shaped on the movement plane, the auto guided vehicle system can perform transporting operation by the means of controlling the three auto guided vehicles 100_5-100_7 to be arranged in the shape of a triangle.

Moreover, the auto guided vehicle system in the embodiment may have the function of tracking moving trail and adjusting centre of gravity as shown in the embodiment of FIG. 3A, and thus no descriptions are incorporated herein. In addition, the number and arrangement pattern of the auto guided vehicle of the auto guided vehicle system of the invention are not limited to the illustration shown in FIG. 3A and FIG. 3B. In an embodiment, the number and arranging method of the plurality of auto guided vehicles of the auto guided vehicle system may be determined according to various object conditions such as the volume, weight or centre of gravity of the object to be transported.

Figure 4:
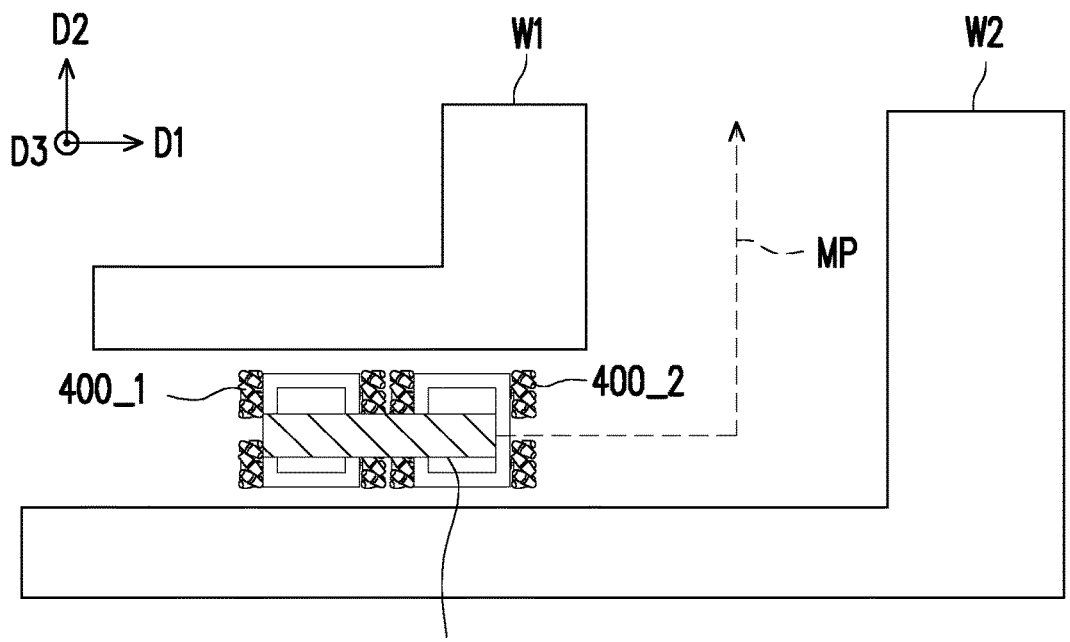
FIG. 4 is a schematic view illustrating a transporting operation according to an embodiment of the invention.

FIG. 4 is a schematic view illustrating a transporting operation according to an embodiment of the invention. Referring to FIG. 4, the auto guided vehicle system in the embodiment may include two auto guided vehicles 400_1 and 400_2. In the embodiment, the auto guided vehicles 400_ and 400_2 may be used to transport an object OB3, wherein the object OB3 is a rectangular-shaped object. The auto guided vehicles 400_1 and 400_2 may be moved along a transporting path MP to avoid obstacles W1 and W2. In the embodiment, since the auto guided vehicles 400_1 and 400_2 are wheel mechanisms having omnidirectional wheel set, in the moving process, there is no need for the auto guided vehicles 400_1 and 400_2 to rotate the direction of the vehicle body.

In the embodiment, the auto guided vehicle 400_2 may be used as a guiding vehicle, and the auto guided vehicle 400_1 may track the moving trail of the auto guided vehicle 400_2. Alternatively, in an embodiment, the auto guided vehicle 400_1 may sense the coding feature element of the auto guided vehicle 400_2 through the image sensor (e.g., coding feature element 150 and image sensor 160 in the embodiment shown in FIG. 2B), such that the auto guided vehicle 400_1 can simultaneously adjust the moving trail thereof along with the movement state of the auto guided vehicle 400_2 in the moving process.

Figure 5:
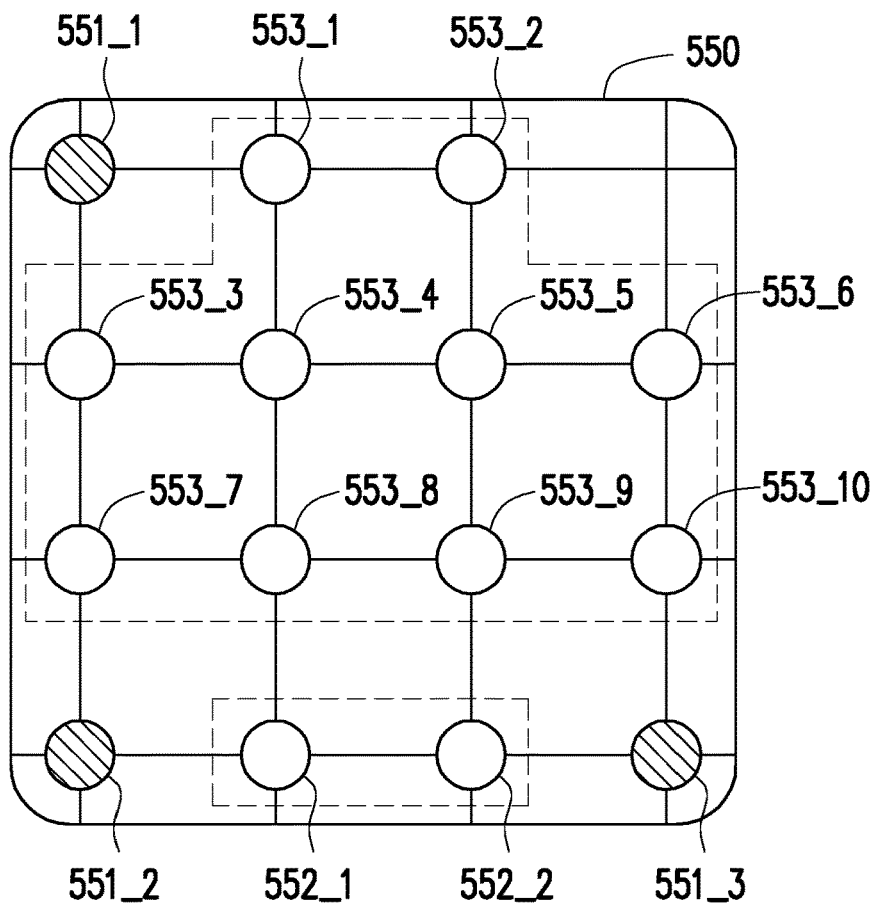
FIG. 5 is a schematic view illustrating a coding feature element according to an embodiment of the invention.

FIG. 5 is a schematic view illustrating a coding feature element according to an embodiment of the invention. Referring to FIG. 5, in the embodiment, a coding feature element 550 may be a coding pattern of 4×4 dot array. In the embodiment, the dot of the coding feature element 550 may be classified into three types. Dots 551_1-551_3 may be used to provide the moving direction information of the vehicle body. Dots 552_1 and 552_2 may be used to provide facing information of the vehicle body. Dots 553_1-553_10 may be used to provide coding information of the vehicle body.

In the embodiment, a line between dots 551_1 and 551_2 is a vertical movement plane, and the line between dots 551_2 and 551_3 is a horizontal movement plane. Therefore, when the sensed auto guided vehicle is rotated, since the line between the dots 551_1 and 551_2 is not changed along with the rotation of the vehicle body, the line between the dots 551_1 and 551_2 may be used a base line. However, for the auto guided vehicle used as a sensor, the line length between the dots 551_2 and 551_3 correspondingly sensed by the image sensor is changed along with the size of the rotating angle. Therefore, the auto guided vehicle may sense the dots 551_1-551_3 of other adjacent auto guided vehicles through the image sensor, and calculate the line length between the sensed dots 551_2 and 551_3 according to the line between the dots 551_1 and 551_2 used as the base line. In this manner, the auto guided vehicle may sense the dots 551_1-551_3 to obtain the movement state of the vehicle body such as the rotating direction and angle change of the vehicle body of the adjacent auto guided vehicle.

In the embodiment, the dots 552_1 and 552_2 may respectively have bright and dark colour change (e.g., dot 551_1 is dark and dot 553_1 is bright). Therefore, the dots 552_1 and 552_2 may have four coding rules (2^2=4 types). In other words, for example, the coding feature elements 150_1-150_4 on four sides of the vehicle body 100B in FIG. 2A may respectively have dots 552_1 and 552_2 having different coding rules to respectively represent the facing information regarding the front side, the left side, the right side and the rear side. In this manner, the auto guided vehicle may obtain the facing information of the vehicle body of the adjacent auto guided vehicle by sensing dots 552_1 and 552_2, thereby acquiring the relative position relationship between the vehicle body and the adjacent auto guided vehicle.

In the embodiment, dots 553_1-553_10 may respectively have bright and dark colour change. Therefore, the dots 553_1 and 553_2 may have 1024 types of coding rules (2^10=1024 types). In other words, the auto guided vehicle system can simultaneously control 1024 auto guided vehicles. Moreover, the auto guided vehicles can sense the dots 553_1-553_10 of adjacent auto guided vehicle to obtain the corresponding coding information, such that the auto guided vehicle can effectively identify the identification of the adjacent auto guided vehicle.

Accordingly, the auto guided vehicle in the embodiments of the invention can perform positioning operation by sensing the coding feature element of adjacent auto guided vehicle as well as track the moving trail of adjacent auto guided vehicle and the movement state of the vehicle body.

However, the coding feature element of the invention is not limited to the number and classification shown in FIG. 5. The coding feature element of the invention may have a coding pattern of N×N dot array, and N is a positive integer larger than or equal to 3. For example, in an embodiment, the coding feature element may be a coding pattern of 3×3 dot array. The coding feature element may be at least classified into 2 types. The coding pattern of 3×3 dot array may be used to at least represent the moving direction information and coding information of the vehicle body, and the arranging method may be the same as the arranging method of the dots as described above; the invention provides no limitation thereto.

Figure 6:
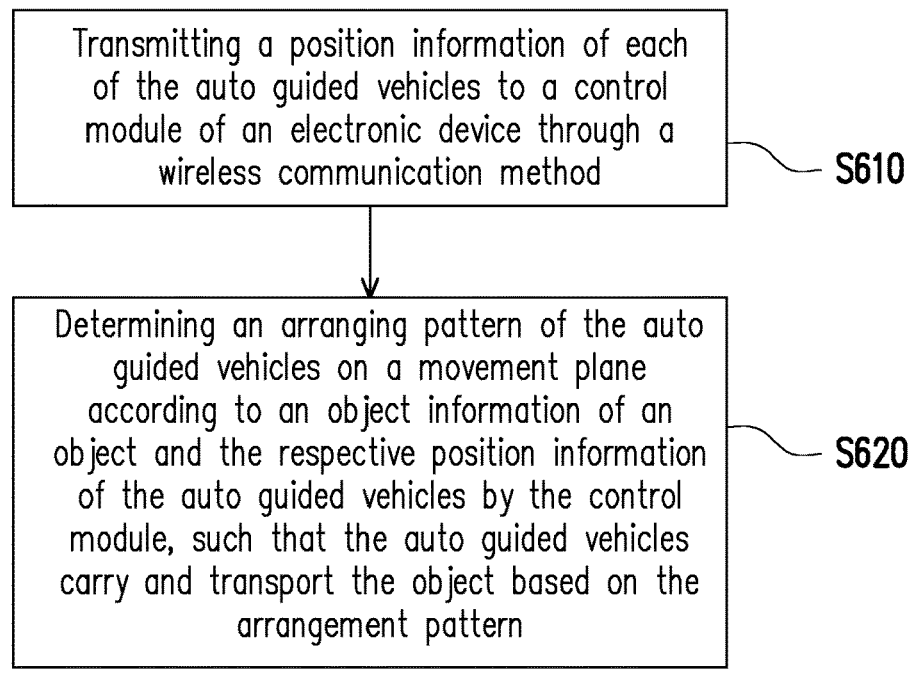
FIG. 6 is process flow of an operating method of an auto guided vehicle system according to an embodiment of the invention.

FIG. 6 is process flow of an operating method of an auto guided vehicle system according to an embodiment of the invention. Referring to FIG. 1, FIG. 3A and FIG. 6, the method in the embodiment may be at least adapted to the auto guided vehicle system 10 and the auto guided vehicles 100_1-100_4 in FIG. 1 and FIG. 3A. In the embodiment, the auto guided vehicle system may include a plurality of auto guided vehicles 100_1-100_4 shown in FIG. 3A. Meanwhile, the auto guided vehicles 100_1-100_4 may be coupled to the electronic device 200 in FIG. 1. In the embodiment, the operating method of the auto guided vehicle may include the following steps. First of all, in step S610, the auto guided vehicles 100_1-100_4 transmit respective position information of the auto guided vehicles 100_1-100_4 to the control module 211 of the electronic device 200 through the wireless communication method. Thereafter, in step S620, the auto guided vehicles 100_1-100_4 may determine the arrangement pattern (e.g., the arrangement pattern in FIG. 3A is a square-shape corresponding to the object) of the auto guided vehicles 100_1-100_4 on the movement plane according to the object information (e.g., object in FIG. 3A is a square-shape) of the object OB1 and respective position information of the auto guided vehicles 100_1-100_4 by using the control module 211, such that auto guided vehicles 100_1-100_4 carry and transport the object OB1 in the arrangement pattern. Accordingly, the auto guided vehicles 100_1-100_4 can effectively carry the object OB1 and perform transporting operation.

Additionally, sufficient teaching, suggestion and implementation regarding other implementation of the operating method of the auto guided vehicle system in the embodiment may be derived from the embodiments illustrated in FIG. 1-FIG. 5, and thus no further descriptions are incorporated herein.

Figure 7:
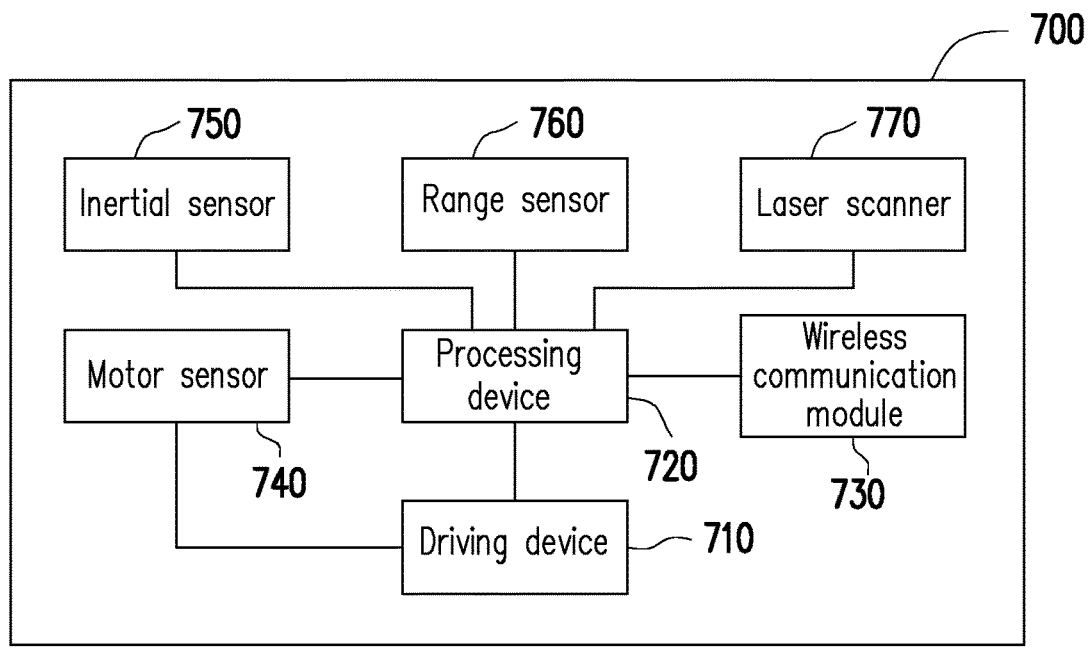
FIG. 7 is a block view illustrating an auto guided vehicle according to another embodiment of the invention.

FIG. 7 is a block view illustrating an auto guided vehicle according to another embodiment of the invention. Referring to FIG. 7, an auto guided vehicle 700 may include a driving device 710, a processing device 720 and a wireless communication module 730. Moreover, as compared with the auto guided vehicle 100 in FIG. 1, the auto guided vehicle 700 in the embodiment may further include a motor sensor 740, an inertial sensor 750, a range sensor 760 and a laser scanner 770.

In the embodiment, the motor sensor 740 is coupled to the processing device 720 and a driving device 710. The motor sensor 740 can sense the driving state of the omnidirectional wheel set driven by the driving device 710 to obtain the moving trail of the auto guided vehicle 700. It should be pointed out that the motor sensor 740 in the embodiment may sense the driving state of one of the omnidirectional wheel among the omnidirectional wheel set, or simultaneously sense the driving state of a plurality of omnidirectional wheels; the invention provides no limitation thereto. In the embodiment, the motor sensor 740 generates a sensing signal according to the rotating state of the omnidirectional wheel set, and compares the driving signal provided by the driving device 710 for driving the omnidirectional wheel set to generate the error signal. In this manner, when the centre of gravity of the auto guided vehicle 700 is shifted (e.g., the actual moving trail and the predetermined moving trail are different), the processing device 720 can adjust the driving signal provided by the driving device 710 according to the error signal, thereby adjusting the centre of gravity of the auto guided vehicle 700.

In the embodiment, the inertial sensor 750 is coupled to the processing device 720. The inertial sensor 750 may sense the movement state of the auto guided vehicle 700. The range sensor 760 is coupled to the processing device 720. The range sensor 760 may sense the distance between the auto guided vehicle 700 and other auto guided vehicles. Even more, in an embodiment, each of the auto guided vehicles 700 may further adjust the relative positions thereof in the arrangement pattern respectively according to the inertial sensor 750 and the range sensor 760. The laser scanner 770 is coupled to the processing device 720.

In the embodiment, the laser scanner 770 can scan the spatial distribution information surrounding the auto guided vehicle 700 (e.g., spatial distribution of obstacles W1 and W2 in the embodiment of FIG. 4), such that the processing device 720 can guide the moving trail of the auto guided vehicle 700 according to the spatial distribution information.

Additionally, sufficient teaching, suggestion and implementation regarding the element feature and implementation related to the auto guided vehicle 700 in the embodiment may be derived from the embodiments illustrated in FIG. 1-FIG. 6, and thus no further descriptions are incorporated herein.

In summary, the auto guided vehicle system in the embodiment of the invention can carry object using the plurality of auto guided vehicles having the omnidirectional wheel set, and determine the arranging method of the auto guided vehicles according to the object information related to the objet. Moreover, the auto guided vehicles in the embodiments of the invention can track the moving trail of a specific vehicle, such that the auto guided vehicles can move simultaneously in a stable manner. Furthermore, the auto guided vehicles in the embodiments of the invention may further be provided with the coding feature element and image sensor on the lateral side of the vehicle body, thereby sensing the moving trail of adjacent auto guided vehicle and the movement state of the vehicle body using the image sensor. In this manner, the auto guided vehicle system in the embodiments of the invention can effectively carry and transport object.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An auto guided vehicle system, adapted to transport an object, wherein the auto guided vehicle system comprises:
   a plurality of auto guided vehicles and each having a vehicle body and an omnidirectional wheel set, and each of the auto guided vehicles further comprising:
      a driving device, configured to drive the omnidirectional wheel set;
      a wireless communication module, configured to communicate with a control module of an electronic device; and
      a processing device, coupled to the driving device and the wireless communication module, and configured to transmit a position information to the control module by the wireless communication module,
   wherein the control module determines an arrangement pattern of the auto guided vehicles on a movement plane according an object information of the object and the respective position information of the auto guided vehicles, such that the auto guided vehicles carry and transport the object in the arrangement pattern, wherein each of the auto guided vehicles further comprises:

at least one coding feature element, disposed on a lateral side of the vehicle body, and configured to at least provide a coding information, a direction information and a facing information of the vehicle body; and at least one image sensor, disposed on the lateral side of the vehicle body, and coupled to the processing device, such that each of the auto guided vehicles senses the at least one coding feature elements of other auto guided vehicle among the auto guided vehicles by the at least one image sensor, wherein the coding feature element includes a coding pattern having N×N dot array, wherein N is a positive integer larger than or equal to 3, wherein the N×N dot array includes a first pair of dots distributed along a first direction to provide a base line and a second pair of dots distributed along a second direction perpendicular to the first direction to provide the direction information and the facing information with respect to the base line.

2. The auto guided vehicle system as claimed in claim 1, wherein the object information comprises at least one of a volume, a weight and a shape of the object.

3. The auto guided vehicle system as claimed in claim 1, wherein the auto guided vehicles are classified into a first vehicle and at least one second vehicle, and the at least one second vehicle tracks a moving trail of the first vehicle using the control module, such that a moving trail of the at least one second vehicle is simultaneously adjusted along with the first vehicle.

4. The auto guided vehicle system as claimed in claim 3, wherein an error is generated between the moving trails of the at least one second vehicle and the first vehicle, the at least one second vehicle determines the moving trail of each of the at least one second vehicle and the first vehicle respectively to correct the moving trail of each of the at least one second vehicles respectively.

5. The auto guided vehicle system as claimed in claim 1, wherein the driving device is a motor, and each of the auto guided vehicles further comprises:

a motor sensor, coupled to the processing device and the driving device, the processing device senses a driving state of the omnidirectional wheel set by the motor sensor, thereby obtaining a moving trail of the vehicle body.

6. The auto guided vehicle system as claimed in claim 5, wherein the motor sensor generates a sensing signal according to the driving state of the omnidirectional wheel set, and the processing device analyzes the sensing signal and a driving signal provided by the driving device for driving the omnidirectional wheel set to generate an error signal, such that the processing device further determines whether to adjust the driving signal according to the error signal.

7. The auto guided vehicle system as claimed in claim 1, wherein each of the auto guided vehicles further comprises:

an inertial sensor, coupled to the processing device, and configured to sense a movement state of the vehicle body; and a range sensor, coupled to the processing device, and configured to sense a distance between the auto guided vehicle and other auto guided vehicle among the auto guided vehicles, wherein when the auto guided vehicles perform the transporting operation, each of the auto guided vehicles further adjusts a relative position of the auto guided vehicle in the arrangement pattern respectively according to the inertial sensor and the range sensor.

8. The auto guided vehicle system as claimed in claim 1, wherein each of the auto guided vehicles further comprises:

a laser scanner, coupled to the processing device, and configured to scan a spatial distribution information surrounding the vehicle body, such that the processing device guides a moving trail of the vehicle body according to the spatial distribution information.

9. An operating method of an auto guided vehicle system, adapted for an auto guided vehicle system, and the auto guided vehicle system comprising a plurality of auto guided vehicles each having an omnidirectional wheel set, wherein the operating method comprises:

transmitting a position information of each of the auto guided vehicles to a control module of an electronic device through a wireless communication method; and determining an arranging pattern of the auto guided vehicles on a movement plane according to an object information of an object and the respective position information of the auto guided vehicles by using the control module, such that the auto guided vehicles carry and transport the object based on the arrangement pattern, wherein the step of performing transporting operation on the object comprises:

sensing at least one coding feature element of other auto guided vehicle among the auto guided vehicles by using at least one image sensor of each of the auto guided vehicles, so as to obtain at least one of a coding information, a direction information and a facing information of the other auto guided vehicle, wherein the coding feature element includes a coding pattern having N×N dot array, wherein N is a positive integer greater than or equal to 3, wherein the N×N dot array includes a first pair of dots distributed along a first direction to provide a base line and a second pair of dots distributed along a second direction perpendicular to the first direction to provide the direction information and the facing information with respect to the base line.

10. The operating method as claimed in claim 9, wherein the object information comprises at least one of a volume, a weight and a shape of the object.

11. The operating method as claimed in claim 9, wherein the auto guided vehicles are classified into a first vehicle and at least one second vehicle, and the step of performing the transporting operation on the object comprises:

tracking a moving trail of the first vehicle by the at least one second vehicle, such that a moving trail of the at least one second vehicle is simultaneously adjusted along with the first vehicle.

12. The operating method as claimed in claim 11, wherein the step of performing the transporting operation on the object further comprises:

when an error is generated between moving trails of the at least one second vehicle and the first vehicle, determining the error between the moving trails of each of the at least one second vehicle and the first vehicle respectively to correct the moving trail of each of the at least one second vehicle respectively.

* * * * *